United States Patent
Zamarreno et al.

(10) Patent No.: US 8,612,464 B2
(45) Date of Patent: Dec. 17, 2013

(54) PORTABLE HASH-BASED KEY LOCATION MECHANISM

(75) Inventors: Galder Zamarreno, Neuchatel (CH); Manik Surtani, London (GB)

(73) Assignee: Red Hat, Inc., Raleigh, NC (US)

( * ) Notice: Subject to any disclaimer, the term of this patent is extended or adjusted under 35 U.S.C. 154(b) by 164 days.

(21) Appl. No.: 12/874,710

(22) Filed: Sep. 2, 2010

(65) Prior Publication Data
US 2012/0059832 A1   Mar. 8, 2012

(51) Int. Cl.
*G06F 17/30*   (2006.01)

(52) U.S. Cl.
CPC ............................ *G06F 17/30017* (2013.01)
USPC ......................................................... 707/758

(58) Field of Classification Search
USPC .................... 707/698, 736, 747, 758, 770
See application file for complete search history.

(56) References Cited

U.S. PATENT DOCUMENTS 7,647,331 B2 * 1/2010 Li et al. ............................ 382/218
8,024,306 B2 * 9/2011 Palliyil et al. ................. 707/698

OTHER PUBLICATIONS

Robert Devine., Design and Implementation of DDH: A Distributed Dynamic Hashing Algorithm, 1998, Google, 14 pages.*
Appleby, Austin, "*MurmurHash 2,0*", http://sites.google.com/site/murmurhash/, printed on Sep. 3, 2010, pp. 1-2.
Karger, David, et al., "Consistent Hashing and Random Trees: Distributed Caching Protocols for Relieving Hot Spots on the World Wide Web", http://citeseerx.ist.psu.edu/viewdoc/summary?doi=10.1.1.23.3738,(1997), pp. 1-10.

* cited by examiner

Primary Examiner — Jean B Fleurantin
(74) Attorney, Agent, or Firm — Lowenstein Sandler LLP (57) ABSTRACT

A system and method for locating a data entry in a server cluster using a hash function and hash codes that can be implemented on any platform, system, or in any language. In one embodiment, a client hashes a key corresponding to a data entry to be accessed from the server cluster. The hashing is performed with a hash function that is used by a cluster of servers to provide a distributed data repository. The client further compares the hash result with hash codes of the servers to identify one of the servers as a key holder that stores the data entry. The client then requests the key holder for access to the data entry.

17 Claims, 5 Drawing Sheets

PORTABLE HASH-BASED KEY LOCATION MECHANISM

TECHNICAL FIELD

Embodiments of the present invention relate to a computer system, and more specifically, to a distributed data repository maintained by a cluster of servers.

BACKGROUND

A server cluster is a group of networked servers that work cooperatively to provide services to clients. A server cluster can provide a data repository that can be efficiently accessible to a client. The data repository can be formed by each server maintaining a local cache for storing data. Data availability can be improved by replication of cached data among the servers. When a data entry is added to any of the caches, the data entry will be replicated to all other caches in the cluster and can be retrieved locally from any cache. Data replication provides a quick and easy way to share data across a cluster. Generally, replication performs well only in small clusters (e.g., under 10 servers). Replication does not scale well in a large cluster due to the large number of replication messages that need to be sent among the servers.

Data distribution usually works better in a large cluster than replication. A distributed data repository is formed by each server maintaining a local cache. Rather than replicating a data entry to all of the servers, a data entry is distributed to one or a subset of the servers in a cluster. Generally, distribution scales linearly as more servers are added to the cluster. As a data entry is stored in only one or some of the servers, the technique for locating a data entry in a distributed data repository can have a significant impact on the system performance.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for a client to locate a data entry in a server cluster using a hash function and hash codes that can be implemented on any platform, system, or in any language. In one embodiment, a client hashes a key corresponding to a data entry to be accessed from the server cluster. The hashing is performed with a hash function that is used by a cluster of servers to provide a distributed data repository. The client further compares the hash result with hash codes of the servers to identify one of the servers as a key holder that stores the data entry. The client then requests the key holder for access to the data entry.

Embodiments of the present invention allow a client running on any platform, system, or in any language, to locate a data entry in a distributed data repository provided by a server cluster. The data entry may be stored by the server cluster as a (key, value) pair, where the key is an index of the data entry. The client receives information from the server cluster that identifies a hash function and hash codes of the servers. The client uses the identified hash function (e.g., a consistent hashing algorithm) to hash the key for a data entry to be accessed by the client. The client then compares the hash result with the hash codes of the servers to identify the holder of the data entry (also referred to as the "key holder" or "key owner" of the data entry). The calculation performed by the client can be easily portable from one client to another client that is implemented on a different platform, system, or in a different language.

Embodiments of the present invention have the advantage of improving the performance of a server cluster. In some systems, the servers in the cluster perform the hash function for locating a key holder. In these systems, a client would send a data access request to a random server in the cluster, and the random server would calculate the location of the key holder. If the random server is not the key holder (i.e., the requested data is not locally stored at the random server), the random server would forward the request to the key holder. As the client has no knowledge of the key holder, it may repeatedly request a data entry from a server that is not the key holder and the server would need to forward the requests repeatedly. Such forwarding for nearly every data access request can significantly slow down the speed of data access.

In the following description, numerous details are set forth. It will be apparent to one skilled in the art, however, that the present invention may be practiced without these specific details. In some instances, well-known structures and devices are shown in block diagram form, rather than in detail, in order to avoid obscuring the present invention.

Figure 1:
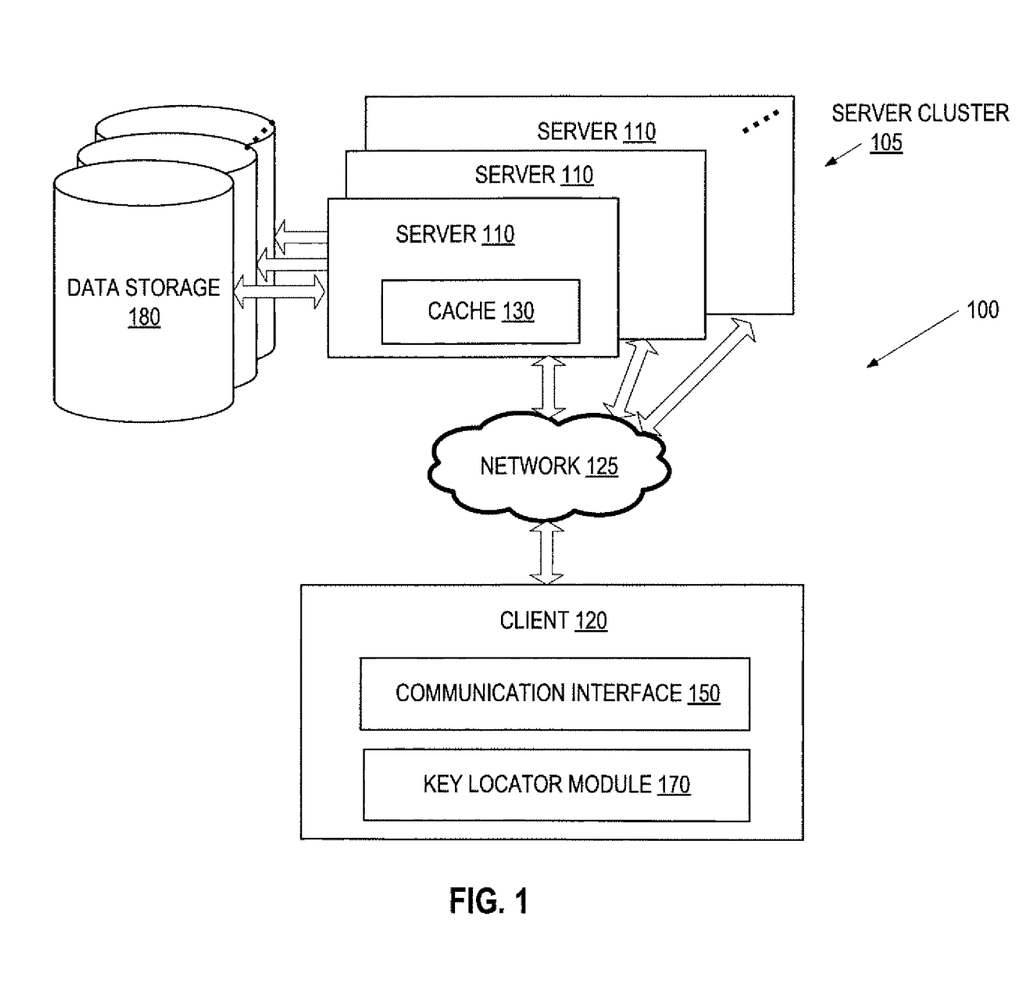
FIG. 1 is a block diagram illustrating an example of a network architecture in which embodiments of the present invention may operate.

FIG. 1 is a block diagram that illustrates a network architecture 100 in which embodiments of the present invention may operate. The network architecture 100 includes a client computer system 120 (also referred to as a "client") coupled to a server cluster 105 over a network 125. The server cluster 105 includes a number of server nodes 110 (also referred to as "servers" or "nodes"). The network 125 may be a private network (e.g., a local area network (LAN), a wide area network (WAN), intranet, etc.) or a public network (e.g., the Internet). In one embodiment, each of the servers 110 and the client 120 can be a server computer, a workstation, a personal computer (PC), a mobile phone, a palm-sized computing device, a personal digital assistant (PDA), etc. In one embodiment, each server 110 may be coupled to data storage 180. The data storage 180 includes one or more mass storage devices, such as magnetic or optical storage based disks, tapes or hard drives.

Although only one client 120 is shown in the embodiment of FIG. 1, it is understood that multiple clients 120 may be coupled to the server cluster 105 via the network 125 or other networks. Each of the multiple clients 120 performs the same function as will be described in greater detail below, and may be implemented on a different platform, system and in a different language. Additionally, the function performed by one of the clients 120 can be readily portable to another of the clients 120.

According to one embodiment of the present invention, each server 110 in the server cluster 105 includes a local cache 130. The local caches 130 in the server cluster 105 form a distributed data repository. In the distributed data repository, each data entry is indexed by a corresponding key. For example, the name of a person may serve as a key to the person's record. The client 120 may access a data entry by sending a data access request (e.g., a read or write request) to the server 110 that stores the data entry locally (also referred to as the "key holder" or "key owner"). The client 120 can determine the key holder based on the result of hashing the key and information received from the server cluster 105.

In one embodiment, the client system 120 includes a communication interface 150 that communicates with the servers 110 in the server cluster 105 according to a pre-determined communication protocol. The client system 120 also includes a key locator module 170 that performs a hashing operation to determine the key holder.

Figure 2:
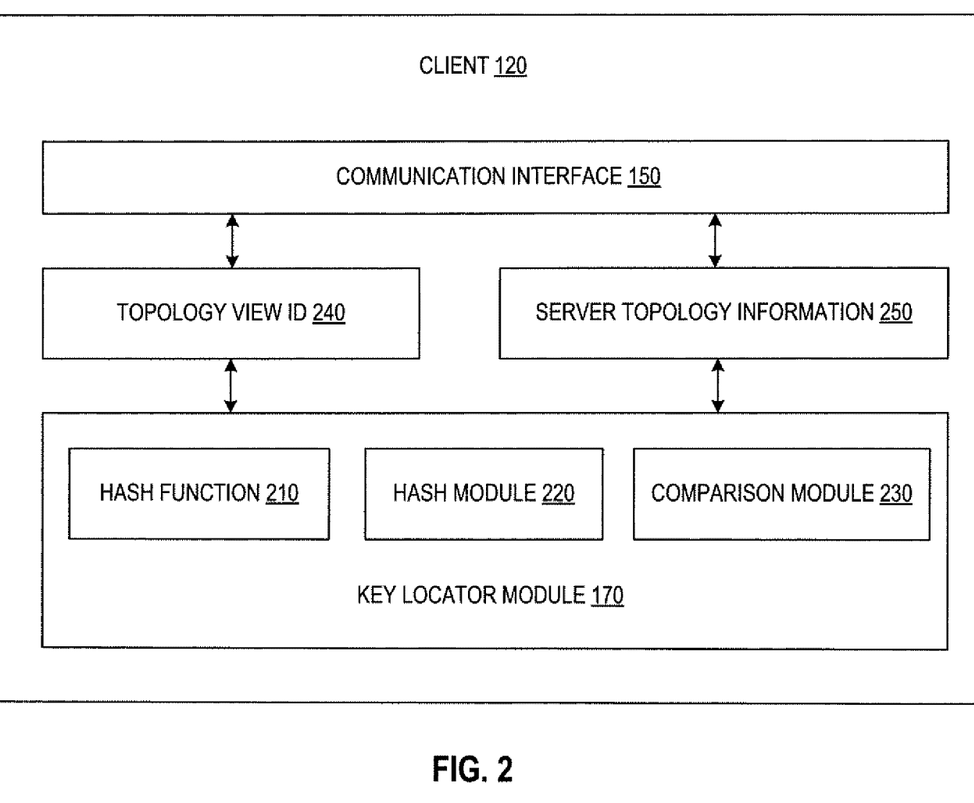
FIG. 2 is a block diagram illustrating one embodiment of a client.

FIG. 2 illustrates an embodiment of the client 120. In one embodiment, the communication interface 150 implements a pre-determined communication protocol to communicate with the servers 110. According to the protocol, when the client 120 requests one of the servers 110 for data access (e.g., read or write a data entry), the communication interface 150 also sends the server 110 a topology view ID 240. The topology view ID 240 indicates a version number of server topology information 250 that is currently stored at the client 120 (e.g., stored in the client's data storage device such as memory). In one embodiment, the server topology information 250 may be obtained by the client 120 sending a request to the servers 110.

In one embodiment, the server topology information 250 includes the number of servers 110 in the cluster 105, the number of key holders for holding each data entry in the distributed data repository, the address of each server 110, the hash function used for data distribution among the servers 110, the hash code associated with each server 110, etc. When any part of the information changes, the servers 110 updates a topology ID held by the servers 110. If the topology ID currently held by the servers 110 is different from the topology view ID 240 received from the client 120, the client 120 will be informed of the topology change and will receive updated server topology information. If the server's topology ID is the same as the topology view ID 240 received from the client 120, the client 120 can keep using the same server topology information 250 stored locally at the client 120.

In one embodiment, the server topology information 250 is used by the key locator module 170 to determine a key holder in the server cluster 105 for a given key. Using a hash function 210 identified by the server topology information 250, a hash module 220 in the key locator module 170 hashes the key corresponding to a data entry to be accessed from the distributed data repository. In one embodiment, the hash function 210 implements a consistent hash algorithm, with which the addition or removal of one server node does not significantly change the mapping of keys to nodes. Using the consistent hash algorithm, only K/n keys need to be remapped on average, where K is the number of keys, and n is the number of nodes.

In one embodiment, the hash result is passed to a comparison module 230. The comparison module 230 in the key locator module 170 looks up the hash codes of the servers 110 from the locally stored server topology information. Each server 110 is associated with a hash code, and the hash codes are used to identify a server as the key holder. In one embodiment, the hash codes of the servers 110 can be arranged to form an increasing sequence of numbers (e.g., integers). For example, three servers A, B and C may have hash codes 5, 20 and 100, respectively. Using the modulo arithmetic, the hash codes form a "hash wheel," with each hash code defining a boundary mark on the wheel. In the above example, server B is said to be after server A in the hash wheel since the hash code of server B is higher than the hash code of server A.

In one embodiment, the comparison module 230 compares the hash result with the hash codes of the servers 110 to determine which hash code is higher than the hash result. In one embodiment, the server 110 having a hash code immediately higher than the hash result is the key holder. In an embodiment where the number of key holders (Num_Key_Owners) is more than one (i.e., the same data entry is held by multiple servers 110), the server 110 having a hash code immediately higher than the hash result is the main key holder. The other (Num_Key_Owners−1) server or servers after the main key holder in the hash wheel are the backup key holders. It is understood that in alternative embodiments, the key holders may be the servers having hash codes lower than the hash result.

For example, a cluster has three servers A, B and C and their hash codes are 5, 20 and 100, respectively. If a key has a hash result 15, the key holder will be B (it is the first node having a hash code higher than the key's hash result). However, if the number of key holders is 2, the two nodes having hash codes higher than 15 will hold the key, which means that both servers B and C are the key holders (C acts as a backup).

Figure 3:
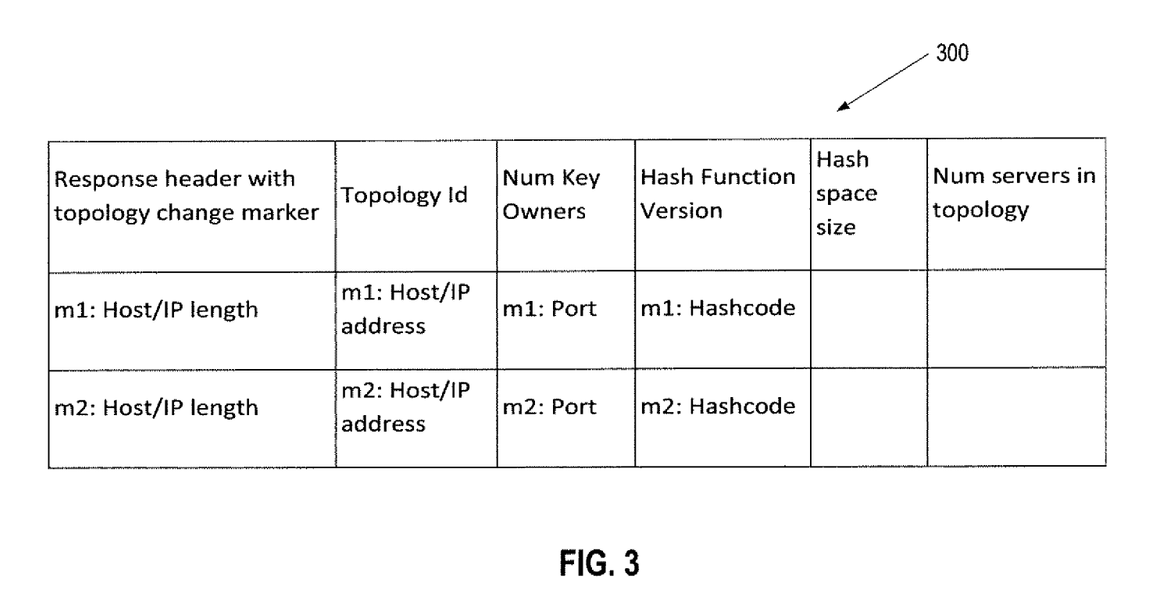
FIG. 3 is an embodiment of a response header received by a client from a server.

FIG. 3 illustrates an embodiment of a response header 300 received by the client 120 from any of the servers 110 in the server cluster 105. In one embodiment, the response header 300 is the header of a response to a client's data access request, where the data access request indicates a topology view ID currently held by the client 120. The topology view ID held by the client 120 is stale when the topology view ID is different from the current topology ID used by the server 110.

In one embodiment, the response header 300 includes, but is not limited to, a topology ID that is currently used by the servers 110, the number of key owners ("key holders") for holding each data entry in the distributed data repository, the hash function version (which is an identifier of the hash function currently used for data distribution), the hash space size (which defines the modulo arithmetic used for the hash function), the number of servers in the topology (i.e., in the server cluster), and the Internet Protocol (IP) address and the hash code of each server in the cluster. The embodiment of FIG. 3 shows only two servers (m1 and m2) in the cluster. It is understood the same data format can be used to provide information about any number of servers in a server cluster.

Figure 4:
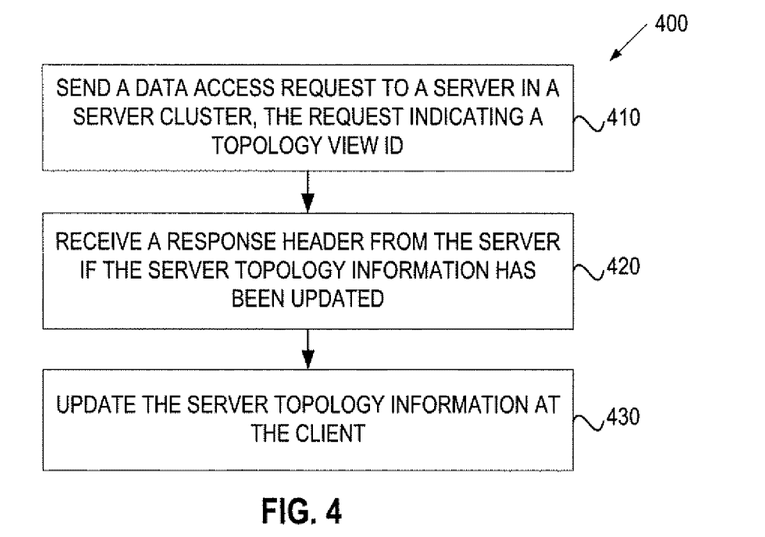
FIG. 4 is a flow diagram illustrating a method for updating server topology information in accordance with one embodiment of the present invention.

FIG. 4 is a flow diagram illustrating one embodiment of a method 400 for a client to receive updated server topology information from a server cluster. The method 400 may be performed by a computer system 600 of FIG. 6 that may comprise hardware (e.g., circuitry, dedicated logic, programmable logic, microcode, etc.), software (e.g., instructions run on a processing device), or a combination thereof. In one embodiment, the method 400 is performed by the client 120 of FIGS. 1 and 2.

Referring to FIG. 4, in one embodiment, the method 400 begins when the client 120 sends a request to one of the servers 110 in the server cluster 105 (block 410). The request may be a data access request (e.g., read or write) that indicates the current topology view ID 240 held by the client. The server 110 determines whether the topology view ID 240 in the request is stale; e.g., by comparing the topology view ID with a topology ID maintained by the server 110. If the topology view ID 240 is current (i.e., not stale), which means that the server 110 receiving the request is the key holder, the server 110 performs the requested data access and sends a response to the client 120. If the topology view ID 240 is stale, the server topology information 250 stored at the client 120 is also stale and needs to be updated. In this scenario, the server 120 sends back the current server topology information to the client 120. In one embodiment, the client 120 receives the server topology information 250 in the form of the response header 300 shown in FIG. 3 (block 420). If the topology view ID 240 is stale and the server 110 receiving the request is not the key holder, the server 110 identifies the key holder, forwards the client's request to the key holder, and forwards a response from the key holder to the client 120. The client 120 then stores the updated server topology information 250 locally so that future requests for accessing the same data entry can be sent directly to the key holder (block 430).

Figure 5:
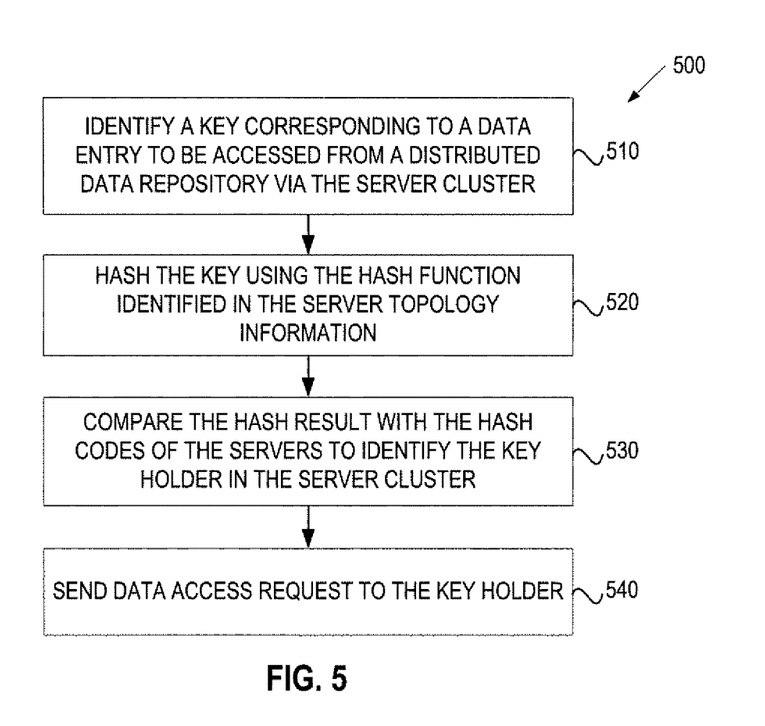
FIG. 5 is a flow diagram illustrating a method for locating a key holder in a server cluster in accordance with one embodiment of the present invention.

FIG. 5 is a flow diagram illustrating one embodiment of a method 500 for a client to locate a key holder in a server cluster. The method 500 may be performed by a computer system 600 of FIG. 6 that may comprise hardware (e.g., circuitry, dedicated logic, programmable logic, microcode, etc.), software (e.g., instructions run on a processing device), or a combination thereof. In one embodiment, the method 500 is performed by the client 120 of FIGS. 1 and 2.

Referring to FIG. 5, in one embodiment, the method 500 begins when the client 120 is triggered (e.g., by a command, a data processing operation, etc.) to send a data access request to the server cluster 105. The client 120 identifies a key corresponding to a data entry to be accessed in the distributed data repository maintained by the server cluster 105 (block 510). The client hashes the key using the hash function indicated in the locally stored server topology information 250 (block 520). The client 120 compares the hash result with the hash codes of the servers 110 to identify the key holder in the server cluster 105 (block 530). In one embodiment, the server having a hash code immediately higher than the hash result is the key holder. The client 120 then sends the data access request to the identified key holder (block 540). The data access request may be accompanied by the key and the current topology view ID 240 locally stored at the client 120. The topology view ID 240 can be used by the server 110 to determine whether the client 120 has the updated server topology information.

Figure 6:
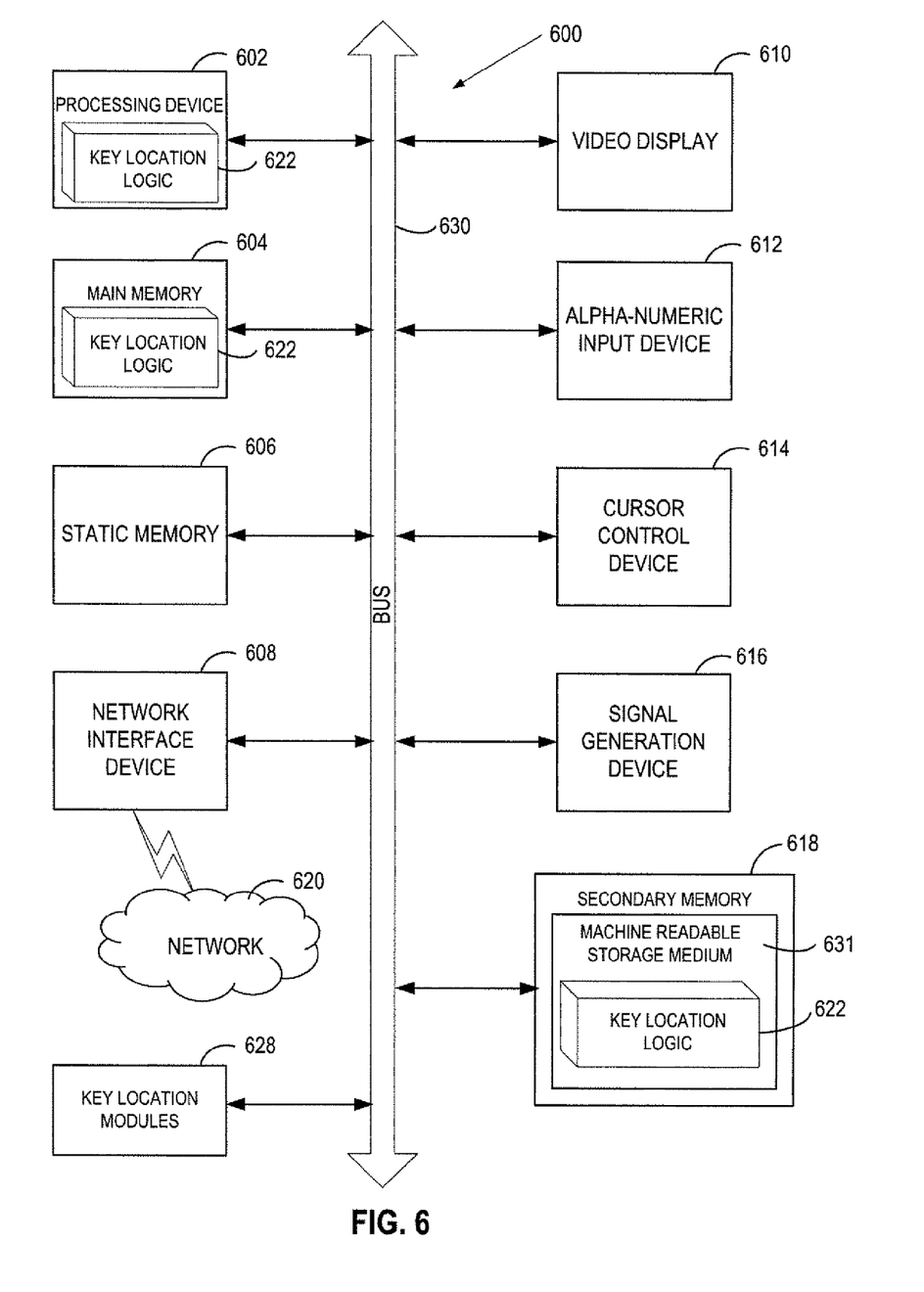
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute key location logic 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or, more specifically, a computer-readable storage medium) 631 on which is stored one or more sets of instructions (e.g., key location logic 622) embodying any one or more of the methodologies or functions described herein (e.g., the client 120 of FIGS. 1 and 2). The key location logic 622 may also reside, completely or at least partially, within the main memory 604 and/or within the processing device 602 during execution thereof by the computer system 600, the main memory 604 and the processing device 602 also constituting machine-readable storage media. The block key location 622 may further be transmitted or received over a network 620 via the network interface device 608.

The machine-readable storage medium 631 may also be used to store the block key location 622 persistently. While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 600 may additionally include key location modules 628 for implementing the functionalities of the client 120 of FIGS. 1 and 2. The module 628, components and other features described herein (for example, in relation to FIG. 1) can be implemented as discrete hardware components or integrated in the functionality of hardware components such as ASICS, FPGAs, DSPs or similar devices. In addition, the module 628 can be implemented as firmware or functional circuitry within hardware devices. Further, the module 628 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "hashing", "identifying", "requesting", "receiving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
   receiving, by a processor, server topology information from a cluster of servers, the server topology information comprising at least one or more of a number of servers in the cluster, a number of key holders for holding a data entry in a distributed data repository, or an identifier of a hash function version;
   hashing, by a client computer system, a key with a hash function identified using the server topology information, the key with the hash function used by the cluster of servers to provide the distributed data repository, the key corresponding to a data entry to be accessed by the client computer system;
   identifying, by the client computer system, one of the servers as a key holder that stores the data entry using a hash result compared with hash codes of the servers; and
   requesting, by the client computer system, the key holder for access to the data entry.

2. The method of claim 1, further comprising:
   receiving, by the client computer system, information identifying the hash function from the cluster of servers.

3. The method of claim 1, further comprising:
   receiving, by the client computer system, information identifying the hash codes that form an increasing sequence of numbers, each of the hash codes associated with one of the servers.

4. The method of claim 1, wherein identifying one of the servers further comprises:
   comparing the hash result with the hash codes of the servers, the hash codes received by the client computer system from the cluster of servers.

5. The method of claim 1, wherein the key holder has a hash code that is immediately higher than the hash result.

6. The method of claim 1, wherein the hashing, identifying and requesting are performed by a plurality of client computer systems that are implemented on different platforms, systems and in different languages.

7. A client computer system comprising:
   a memory to store server topology information; and
   a processor coupled to the memory and a cluster of servers that provide a distributed data repository, the processor to:
   receive the server topology information from the cluster of servers, the server topology information comprising at least one of a number of servers in the cluster, a number of key holders for holding a data entry in the distributed data repository, or an identifier of a hash function, wherein the identifier of the hash function is a hash function version;
   hash a key with a hash function identified using the server topology information, the key with the hash function used by the cluster of servers, the key corresponding to a data entry to be accessed by the processor;
   identify, using a hash result compared with hash codes of the servers, one of the servers as a key holder that stores the data entry; and
   requests the key holder for access to the data entry using a communications device coupled to the processor.

8. The client computer system of claim 7, the processor to receive information identifying the hash function from the cluster of servers.

9. The client computer system of claim 7, the processor to receive information identifying the hash codes that form an increasing sequence of numbers, each of the hash codes associated with one of the servers.

10. The client computer system of claim 7, wherein the client computer system further comprises:
a comparison module to compare the hash result with the hash codes of the servers, the hash codes received by the client computer system from the cluster of servers.

11. The client computer system of claim 7, wherein the processor of the client computer system to further identify the one of the servers as the key holder that has a hash code immediately higher than the hash result.

12. A non-transitory computer readable storage medium including instructions that, when executed by a processor, cause the processor to perform:
receiving, by the processor, server topology information from a cluster of servers, the server topology information comprising at least one of a number of servers in the cluster, a number of key holders for holding a data entry in a distributed data repository, or an identifier of a hash function, wherein the identifier of the hash function is a hash function version;
hashing a key with the hash function which is used by the cluster of servers to provide the distributed data repository, the key corresponding to a data entry to be accessed by a client computer system;
identifying one of the servers as a key holder that stores the data entry using a hash result compared with hash codes of the servers; and
requesting the key holder for access to the data entry.

13. The computer readable storage medium of claim 12, wherein the instructions further cause the processor to receive information identifying the hash function from the cluster of servers.

14. The computer readable storage medium of claim 12, wherein the instructions further cause the processor to receive information identifying the hash codes that form an increasing sequence of numbers, each of the hash codes associated with one of the servers.

15. The computer readable storage medium of claim 12, wherein identifying one of the servers further comprises:
comparing the hash result with the hash codes of the servers, the hash codes received by the client computer system from the cluster of servers.

16. The computer readable storage medium of claim 12, wherein the key holder has a hash code that is immediately higher than the hash result.

17. The computer readable storage medium of claim 12, wherein the hashing, identifying and requesting are performed by a plurality of client computer systems that are implemented on different platforms, systems and in different languages.

* * * * *